(12) United States Patent  
Moffett

(10) Patent No.: US 7,048,859 B1
(45) Date of Patent: *May 23, 2006

(54) METHOD FOR TREATMENT OF AQUEOUS STREAMS COMPRISING BIOSOLIDS

(75) Inventor: Robert Harvey Moffett, Landenberg, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/013,406

(22) Filed: Dec. 11, 2001

Related U.S. Application Data

(63) Continuation-in-part of application No. 09/660,333, filed on Sep. 12, 2000, which is a continuation-in-part of application No. 09/315,099, filed on May 19, 1999, now Pat. No. 6,132,625, which is a continuation-in-part of application No. 09/086,048, filed on May 28, 1998, now abandoned.

(51) Int. Cl.
*C02F 1/56* (2006.01)

(52) U.S. Cl. ............. 210/714; 210/666; 210/725; 210/727; 210/730; 210/734; 210/735; 210/906

(58) Field of Classification Search ............ 210/710, 210/705, 725, 727, 728, 730, 731, 734, 735, 210/736, 905, 665–667, 714
See application file for complete search history.

(56) References Cited

U.S. PATENT DOCUMENTS

| | | | |
|---|---|---|---|
| 2,261,924 A * | 11/1941 | Pittman et al. ............. 210/714 |
| 4,013,555 A * | 3/1977 | Davis ......................... 210/725 |
| 4,923,629 A | 5/1990 | Hasegawa et al. |
| 4,927,498 A | 5/1990 | Rushmere |
| 4,933,087 A | 6/1990 | Markham, Jr. et al. |
| 4,954,220 A | 9/1990 | Rushmere |
| 5,127,994 A | 7/1992 | Johansson |
| 5,174,903 A | 12/1992 | Miller |
| 5,178,770 A | 1/1993 | Chung |
| 5,204,452 A | 4/1993 | Dingilian et al. |
| 5,269,939 A * | 12/1993 | Laurent et al. ............. 210/705 |
| 5,278,284 A | 1/1994 | Lusk et al. |
| 5,393,435 A | 2/1995 | Deans et al. |
| 5,413,720 A | 5/1995 | Miller |
| 5,429,749 A | 7/1995 | Chung et al. |
| 5,433,853 A | 7/1995 | Mamone |
| 5,433,865 A * | 7/1995 | Laurent ...................... 210/727 |
| 5,482,693 A | 1/1996 | Rushmere et al. |
| 5,496,440 A | 3/1996 | Carre et al. |
| 5,496,572 A | 3/1996 | Rudden |
| 5,531,907 A | 7/1996 | Williams et al. |
| 5,569,385 A | 10/1996 | O'Carroll et al. |

(Continued)

FOREIGN PATENT DOCUMENTS

EP    471 408    2/1992

(Continued)

OTHER PUBLICATIONS ller and Dalton, J. Phys. Chem. vol. 60, pp. 955-957, 1956.

(Continued)

*Primary Examiner*—Peter A. Hruskoci

(57) ABSTRACT

A process is provided which can be used to clarify substantially aqueous streams and optionally separate biosolids, especially proteins, from food processing operations which comprises contacting an aqueous stream comprising biosolids with an anionic inorganic colloid and an organic polymer to flocculate the biosolids.

18 Claims, 9 Drawing Sheets

U.S. PATENT DOCUMENTS

| | | | |
|---|---|---|---|
| 5,597,490 | A | 1/1997 | Chung et al. |
| 5,603,805 | A | 2/1997 | Andersson et al. |
| 5,620,629 | A | 4/1997 | Salmen et al. |
| 5,626,721 | A | 5/1997 | Rushmere et al. |
| 5,653,886 | A | 8/1997 | Kerr et al. |
| 5,658,462 | A | 8/1997 | Hopkins et al. |
| 5,667,697 | A | 9/1997 | Salmen et al. |
| 5,695,647 | A | 12/1997 | Carbonell et al. |
| 5,725,780 | A | 3/1998 | Carpenter et al. |
| 5,807,496 | A | 9/1998 | Guerro |
| 5,846,384 | A | 12/1998 | Schold et al. |
| 5,858,174 | A | 1/1999 | Persson et al. |
| 6,083,404 | A | 7/2000 | Sommese et al. |
| 6,132,625 | A | 10/2000 | Moffett |
| 6,203,711 | B1 | 3/2001 | Moffett |
| 6,261,459 | B1 * | 7/2001 | Waldmann ............... 210/666 |
| 6,780,330 | B1 * | 8/2004 | Moffett .................... 210/725 |

FOREIGN PATENT DOCUMENTS

| | | |
|---|---|---|
| EP | 544 225 | 6/1993 |
| EP | 491 879 | 6/1994 |
| EP | 502 089 | 6/1994 |
| EP | 765 844 | 4/1997 |
| JP | H08-322547 | 12/1996 |
| WO | WO 89/06837 | 7/1989 |
| WO | WO 91/07350 | 5/1991 |
| WO | WO 91/07351 | 5/1991 |
| WO | WO 94/05595 | 3/1994 |

OTHER PUBLICATIONS

G. D. Najafpour et al., Biological Conversion of Poultry Processing Waste to Single Cell Protein, *Bioresource Technology*, 48, pp. 65-70, 1994.

Tiande Cai et al., Stabilization of Poultry Processing By-Products and Poultry Carcasses Through Direct Chemical Acidification, *Bioresource Technology 52*, 52, pp. 69-77, 1995.

* cited by examiner

METHOD FOR TREATMENT OF AQUEOUS STREAMS COMPRISING BIOSOLIDS

This application is a continuation-in-part of application Ser. No. 09/660,333, filed Sep. 12, 2000; which is a continuation-in-part of application Ser. No. 09/315,099, filed May 19, 1999, now U.S. Pat. No. 6,132,625; which is a continuation-in-part of application Ser. No. 09/086,048, filed May 28, 1998, now abandoned.

FIELD OF THE INVENTION

This invention relates to a process for clarification of substantially aqueous process streams, and more particularly to separation of biosolids, especially proteins, from food processing operations, such as animal processing, especially poultry processing.

BACKGROUND OF THE INVENTION

Large amounts of biosolids, such as proteins, carbohydrates, fats and oils, are collected in aqueous streams during food processing operations, such as waste and wash waters from the slaughter of animals for food products and other food processing operations such as extraction of proteins during soybean processing, and the like. The aqueous stream must be clarified, i.e., have suspended solids separated and removed to recover valuable product or before being discharged from the processing plant to a municipal or public water system. When separated and dried, the biosolids have value, for example, as animal feed, crop fertilizers, in pharmaceuticals and in personal care products. In one particular example, recovered protein from soybeans may be used in infant formula.

These biosolids are comprised of particles having surface charges. Typically the particles have anionic surface charges at alkaline and neutral pH. The surface charge generates a repulsive force between particles to keep them apart. For individual particles of colloidal size, such as proteins, gravitational forces are insufficient to cause them to settle out of the aqueous suspension. Simple separation methods, such as filtration, are ineffective to separate these protein solids due to blinding of filters or ability of the solids to pass through them. Thus separation and hence, recovery of the protein may be low and/or a waste stream may not be environmentally acceptable for discharge from the processing plant.

Techniques for removal of proteins, carbohydrates, fats and oils, and other biological contaminants from aqueous food processing streams are known. A common practice is to separate the protein, fats and oils from the aqueous stream by flocculation with metal salts, especially iron and/or aluminum salts, and anionic polymers. As it is common to use the recovered proteins, carbohydrates, fats and oils in animal feed, there are health issues when metal salts are used to separate biosolids. There is concern that the recovered biosolids have high levels of metal salts, which may build up in the tissues of the animals to whom the feed is given, these tissues being subsequently consumed by humans. Animal nutritionists are also concerned that metal salts may bind to phosphates in the feed so that they are less available as a nutrient. The food processing industry has sought alternatives to the use of metal salts for separation of proteins, carbohydrates, fats, and oils from aqueous streams.

While methods have been disclosed for clarification of aqueous streams from food processing plants and separation of biosolids therefrom which do not require metal salts, each of these suffer from disadvantages such as high costs of materials and long period to sufficiently clarify the stream. The present invention provides an economic and efficient process to clarify aqueous streams from food processing and to separate and recover protein in a form capable of subsequent commercial use.

SUMMARY OF THE INVENTION

A process, which can be used for clarifying a substantially aqueous streams comprising biosolids, is provided. The process comprises or consists essentially of contacting a substantially aqueous stream, which comprises biosolids, with an effective amount of (1) an anionic inorganic colloid and (2) an organic polymer to produce flocculated biosolids wherein the organic polymer is selected from the group consisting of cationic polymers, amphoteric polymers, and mixtures thereof and has a number average molecular weight of greater than 1,000,000.

DETAILED DESCRIPTION OF THE INVENTION

Figure 1:
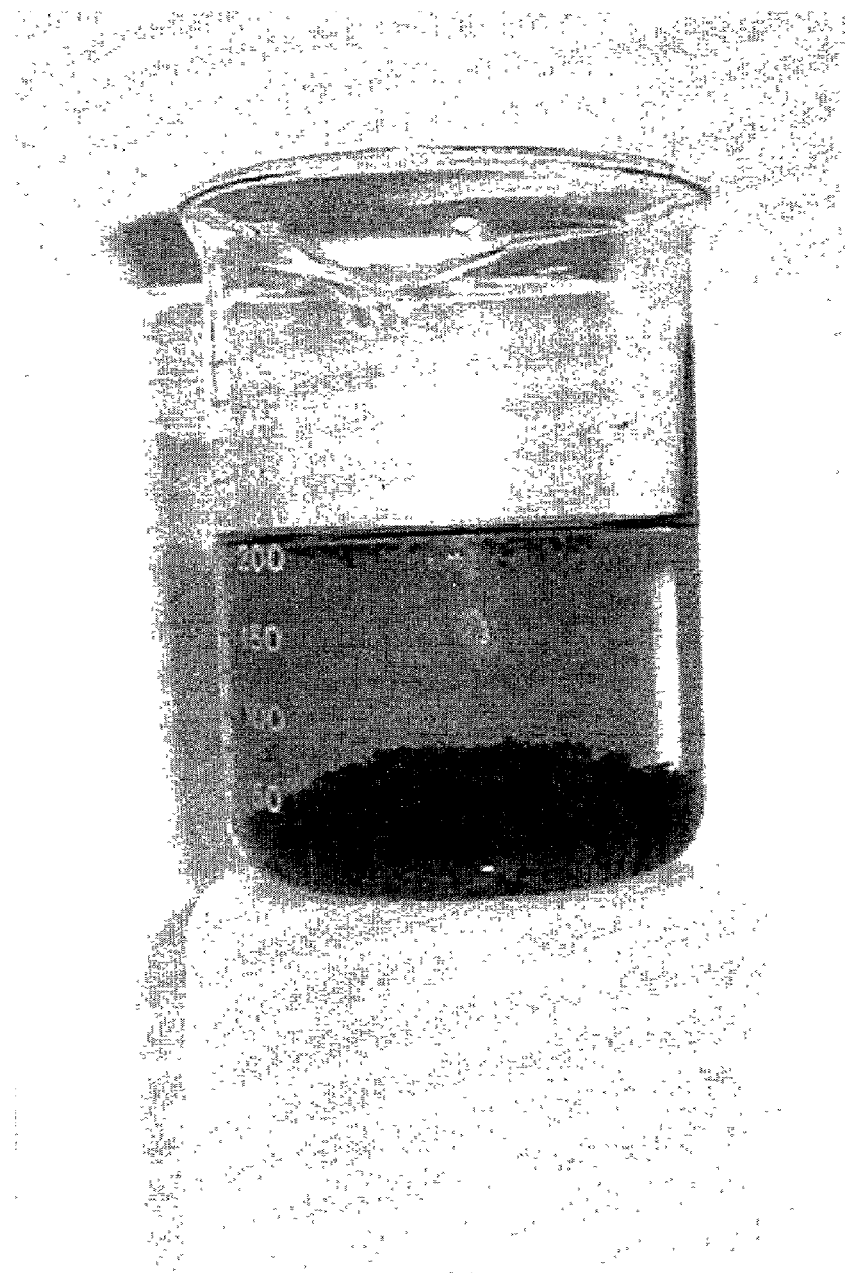
FIG. 1 is a photograph showing the results of Example 17, Run 51.

According to the invention, a substantially aqueous stream (hereinafter "stream") comprises biosolids. Biosolids can be suspended, dispersed, or soluble in the stream. The stream can also be contacted, before being contacted with a polymer, with an acid, if desired, to reduce pH of the stream to less than pH 7, preferably lower than 6, and more preferably lower than 5. The stream can also be contacted simultaneously with the anionic inorganic colloid and an acid to reduce the pH.

Biosolids can be suspended or dispersed in streams due to surface charge effects. Surface charge depends on pH. The present invention also provides a process, which comprises, consists essentially of, or consists of, contacting a stream comprising biosolids possessing surface negative charge sites with an effective amount of: (a) a first organic polymer, which is a cationic polymer, to reduce the number of surface negative charge sites on the biosolids, so that the biosolids have at least some cationic sites; (b) an anionic inorganic colloid; and (c) a second organic polymer, which can be selected from the group consisting of cationic and amphoteric polymers, and mixtures thereof to produce flocculated biosolids or (c), if the anionic inorganic colloid is a silica-based colloid, a second organic polymer, which can be selected from the group consisting of cationic, anionic, and amphoteric polymers, and mixtures thereof.

As defined herein, to flocculate means to separate suspended biosolids, from a stream comprising biosolids wherein the biosolids become aggregated and separate to the top or bottom of the stream in which the biosolids had previously been suspended. Flocculation produces a flocculated material, which, if desired, can be physically separated from the stream. In the present invention, it is desirable to maximize the size of the flocculated material in order to facilitate removal of this material from the stream.

Substantially Aqueous Stream

Biosolids can be proteins, carbohydrates, fats, and oils which must be treated to remove the potentially valuable biosolids products and/or before the stream can be discharged from the plant. The stream is often derived from food processing plants and have solids contents of from about 0.01% to about 5% on a weight basis. This invention process can be used to flocculate the biosolids, and optionally separate therefrom the biosolids for subsequently use in, for example, animal feeds.

The preferred stream is derived from a food (animal or vegetable) or feed processing. Food or feed processing can include the following processes. Animal slaughterhouses and animal processing plants and other food processing plants may produce streams comprising protein, fats and oil. Animal slaughterhouses and processing plants include those for cattle, hogs, poultry and seafood. Other food processing plants include plants for vegetable, grain and dairy food processing, for example, plants for processing soybeans, rice, barley, cheese, and whey; plants for wet-milling of starches and grains; as well as breweries, distilleries and wineries. Biosolids present in streams from these processes can include sugars, starches and other carbohydrates in addition to protein, fats, and oils. For example in processing of soybeans, proteins are extracted into an aqueous stream from which they are subsequently recovered. Food processing plants can also be activated sludge plants, wherein the wastewater is treated with bacteria and/or other organisms, which subsequently partially decompose the wastewater.

Municipal wastewater comprising biosolids is also contemplated as an aqueous stream that can be effectively treated using the process of the present invention. This process is especially useful for treating streams from animal processing, and more particularly, from poultry processing.

The invention process is also useful in treatment of aqueous suspensions of biosolids derived from food processing, which may have non-food end uses. For example, when separated and recovered, proteins are useful in certain cosmetics and other skin care formulations; starch has numerous non-food uses, including uses in paper manufacture. Further still, this invention is useful to treat in general, any stream comprising biosolids, which may result from non-food processing operations. Moreover, though the biosolids, as disclosed above, are generally suspended in a stream, a substantially concentration of quantity of biosolids can also be dissolved in the stream depending on the property of the stream or the biosolids such as, for example, pH, salinity, or other parameters.

Anionic Inorganic Colloid

Anionic inorganic colloids useful in the process of this invention can include silica-based and non-silica-based anionic inorganic colloids and mixtures thereof. Silica-based anionic inorganic colloids include, but are not limited to, colloidal silica, aluminum-modified colloidal silica, polysilicate microgels, polyaluminosilicate microgels, polysilicic acid, and polysilicic acid microgels, and mixtures thereof. For those colloids containing aluminum, the aluminum can be on surface and/or in interior of particles. Non-silica-based anionic inorganic colloids include clays, especially colloidal bentonite clay. Other non-silica-based anionic inorganic colloids include colloidal tin and titanyl sulfate.

The anionic inorganic colloids used in this invention can be in the form of a colloidal silica having an S value >70%, generally >75%, and containing about 2 to 60% by weight of $SiO_2$, preferably about 4 to 30% by weight of $SiO_2$. The colloid can have particles with at least a surface layer of aluminum silicate or it can be an aluminum modified silica sol. The alumina content of the surface-modified silica sol can be in the range of 2 to 25%. The colloidal silica particles in the sols commonly have a specific surface area of 50–1200 $m^2/g$, more preferably about 200–1000 $m^2/g$, and most preferably a specific surface area of about 300–700 $m^2/g$. The silica sol can be stabilized with alkali in a molar ratio of $SiO_2:M_2O$ of from 10:1 to 300:1, preferably 15:1 to 100:1, and most preferably 6:1 to 12:1 (M is Na, K, Li, or $NH_4$). The colloidal particles have a particle size of less than 60 nm, with an average particle size less than 20 nm, and most preferably with an average particle size of from about 1 nm to 10 nm.

Microgels are distinct from colloidal silica in that the microgel particles usually have surface areas of 1000 $m^2/g$ or higher and the microgels are comprised of small 1–2 nm diameter silica particles linked together into chains and three-dimensional networks. Polysilicate microgels, also known as active silicas, have $SiO_2:Na_2O$ ratios of 4:1 to about 25:1, and are discussed on pages 174–176 and 225–234 of "The Chemistry of Silica" by Ralph K. Iler, published by John Wiley and Sons, N.Y., 1979. Polysilicic acid generally refers to those silicic acids that have been formed and partially polymerized in the pH range 1–4 and comprise silica particles generally smaller than 4 nm diameter, which thereafter polymerize into chains and three-dimensional networks. Polysilicic acid can be prepared in accordance with the methods disclosed in U.S. Pat. Nos. 5,127,994 and 5,626,721, incorporated herein by reference. Polyaluminosilicates are polysilicate or polysilicic acid microgels in which aluminum has been incorporated within the particles, on the surface of the particles, or both. Polysilicate microgels, polyaluminosilicate microgels and polysilicic acid can be prepared and stabilized at acidic pH. Better results have been generally found to occur with larger microgel sizes; generally greater than 10 nm size microgels give the best performance. Microgel size can be increased by any of the known methods such as of aging of the microgel, changing pH, changing concentrations, or other methods, known to those skilled in the art.

The polysilicate microgels and polyaluminosilicate microgels useful in this invention are commonly formed by the activation of an alkali metal silicate under conditions described in U.S. Pat. Nos. 4,954,220 and 4,927,498, incorporated herein by reference. However, other methods can also be employed. For example, polyaluminosilicates can be formed by the acidification of silicate with mineral acids containing dissolved aluminum salts as described in U.S. Pat. No. 5,482,693, incorporated herein by reference. Alumina/silica microgels can be formed by the acidification of silicate with an excess of alum, as described in U.S. Pat. No. 2,234,285, incorporated herein by reference.

In addition to conventional silica sols and silica microgels, silica sols such as those described in European patents EP 491879 and EP 502089, incorporated herein by reference, can also be used for the anionic inorganic colloid in this invention. These are commonly referred to as low "S value" sols. EP 491879 discloses a silica sol having an S value in the range of 8 to 45% wherein the silica particles have a specific surface area of 750 to 1000 m²/g, which have been surface-modified with 2 to 25% alumina. EP 502089 discloses a silica sol having a molar ratio of $SiO_2$ to $M_2O$, wherein M is an alkali metal ion and/or an ammonium ion of 6:1 to 12:1 and containing silica particles having a specific surface area of 700 to 1200 m²/g.

Included within the scope of colloidal silica sols useful in the present invention are colloidal silica sols having a low "S value". S value is defined by Iler and Dalton in *J. Phys. Chem.*, 1956, vol. 60, pp. 955–957. S value is a measure of the degree of aggregate or microgel formation and a lower S value indicates a higher microgel content and is determined by the measure of the amount of silica, in weight percent, in the disperse phase. The disperse phase consists of particles of anhydrous silica together with any water that is immobilized at the surface or in the interior of the particles. Preferred colloidal silica sols useful in the process of this invention have an S value of less than about 50%.

The anionic inorganic colloids are used in an effective amount, together with an organic polymer to produce flocculated biosolids. An effective amount can range from about 1 to 7500 parts per million (ppm) by weight as solids, e.g., as $SiO_2$, based on the solution weight of the aqueous stream. Generally an inorganic colloid can be present from about 1 to about 5000, preferably about 10 to about 3000, more preferably about 20 to about 2000, even more preferably about 40 to about 1000, and most preferably 50 to 1000 ppm, depending on the anionic inorganic colloid. For example, for polysilicic acid or polysilicate microgels, about 2 to about 1000, preferably 10 to about 500, and most preferably 20 to 400 ppm can be very effective. Also for example, for colloidal silica, about 4 to about 3000, preferably about 20 to about 2000, more preferably about 30 to about 1000, even more preferably about 40 to about 1000, and most preferably 50 to 1000 ppm can be effective. Further for example, for inorganic colloidal clays, such as bentonite, about 2 to about 2000, preferably about 20 to about 2000, more preferably about 50 to about 2000, even more preferably about 75 to about 2000, and most preferably 100 to 1000 ppm can be effective.

Organic Polymers

Organic polymers useful in the process of this invention include cationic and amphoteric polymers and mixtures thereof. A suitable organic polymer preferably does not include a silicon atom in the polymer. Cationic polymers are polymers with positively charged functional groups attached along the chain. Amphoteric polymers contain both positive and negative charges. The organic polymers typically have a number average molecular weight greater than 1,000,000. These are generally referred to as "high molecular weight polymers".

High molecular weight cationic organic polymers include both natural and synthetic polymers. Natural cationic polymers, such as cationic starch, cationic guar gum, chitosan, are derived from biological sources. Synthetic cationic polymers can be prepared by free radical polymerization and include, for example, cationic polyacrylamide. Cationic starches include those formed by reacting starch with a tertiary or quaternary amine to provide cationic products with a degree of substitution of from 0.01 to 1.0, containing from about 0.01 to 1.0 weight % nitrogen. Suitable starches include potato, corn, waxy maize, wheat, rice and oat. Preferably the high molecular weight cationic organic polymer is polyacrylamide.

The high molecular weight cationic organic polymers are used in an effective amount, together with an anionic inorganic colloid to produce flocculated biosolids. An effective amount of a cationic polymer can range from about 0.2 to 5000 ppm based on the solution weight of the aqueous stream. The preferred range is from about 1 to 2500 ppm.

Amphoteric polymers include amphoteric starch, guar gum and synthetic amphoteric high molecular weight organic polymers. Amphoteric polymers are typically used in the same amounts as the high molecular weight cationic polymers.

When the stream, which comprises biosolids possessing surface negative charge sites, is first contacted with an effective amount of a first organic polymer to reduce the number of the surface negative charge sites. The first organic polymer is a cationic polymer, which is used to reduce the number of surface negative charge sites and to impart some cationic sites. An effective amount is typically an amount sufficient to neutralize at least 1%, and preferably at least 10% of the surface negative charge sites on the biosolids. Low or high molecular weight cationic organic polymers, or mixtures thereof can be used. Low molecular weight cationic organic polymers are preferred due to their higher cationicity and lower cost of use.

Useful low molecular weight cationic polymers have a number average molecular weight lower than 1,000,000, generally between about 2,000 to about 1,000,000, preferably between 10,000 and 500,000. The low molecular weight polymer can be, for example, polyethylene imine, polyamines, polycyandiamide formaldehyde polymers, amphoteric polymers, diallyl dimethyl ammonium chloride polymers, diallylaminoalkyl (meth)acrylate polymers and dialkylaminoalkyl (meth)acrylamide polymers, a copolymer of acrylamide and diallyl dimethyl ammonium chloride, a copolymer of acrylamide and diallylaminoalkyl (meth)acrylates, a copolymer of acrylamide and dialkyldiaminoalkyl (meth)acrylamides, and a polymer of dimethylamine and epichlorohydrin, disclosure of which is disclosed in U.S. Pat. Nos. 4,795,531 and 5,126,014.

The first organic polymer, a high or low molecular weight cationic organic polymer, or mixtures thereof, can be added in an effective amount to reduce the number of surface negative charge sites on the biosolids. An effective amount depends on several factors, including the number of surface negative charge sites present on the biosolids in the aqueous stream, the type of biosolid, and the pH of the stream. An effective amount can be determined by means available and known to those skilled in the art, using techniques such as colloidal titration. Generally this amount can be in the range of from about 0.01 to about 10,000 ppm of polymer, based on total weight of the stream.

A second organic polymer can then be added to the stream, depending on the anionic inorganic colloid. The second organic polymer can be a cationic, anionic, amphoteric polymer, or mixtures thereof for any anionic inorganic colloid. For example, if the anionic inorganic colloid is a silica-based anionic inorganic colloid, the second organic polymer can be an anionic, cationic, amphoteric polymers, or mixtures thereof. Cationic and amphoteric polymers are described above and can be high or low molecular weight polymers.

Anionic polymers that can be used in the process of this invention have a number average molecular weight of at least 500,000 and a degree of anionic substitution of at least 1 mole %. Anionic polymers with number average molecular weights of greater than 1,000,000 are preferred. Preferably the degree of anionic substitution is 10–70 mole %.

Examples of useful anionic polymers include, but are not limited to, water soluble vinylic polymers containing acrylamide, acrylic acid, acrylamido-2-methylpropylsulfonate and/or mixtures thereof, and can also be either hydrolyzed acrylamide polymers or copolymers of acrylamide or a homolog, such as methacrylamide, with acrylic acid or a homolog, such as methacrylic acid, or even with monomers such as maleic acid, itaconic acid, vinyl sulfonic acid, acrylamido-2-methylpropylsulfonate, and other sulfonate containing monomers. Anionic polymers are disclosed, for example, in U.S. Pat. Nos. 4,643,801; 4,795,531, and 5,126,014.

Other anionic polymers that can be used include anionic starch, anionic guar gum and anionic polyvinyl acetate.

Optional Components

If desired, the pH of the aqueous may be first reduced to less than pH 7 using an acid, preferably no greater than 6, and more preferably about 5 or lower. Typically, mineral acids such as sulfuric acid, hydrochloric acid and nitric acid are preferred. Other useful acids include, but are not limited to, carbon dioxide, sulfonic acids, and organic acids such as carboxylic acids, acrylic acids and acidic anionic inorganic colloids, partially neutralized acids in which one or more protons are replaced with a metal or ammonium ion, and mixtures thereof. Acidic anionic inorganic colloids include, but are not limited to, low molecular weight polysilicic acid, high molecular weight polysilicic acid microgels, acidic polyaluminosilicates and acid stabilized polysilicate microgels. Examples of acid-stabilized polysilicate microgels are described in U.S. Pat. Nos. 5,127,994 and 5,626,721. Low molecular weight polysilicic acid typically has a particle size of less than 10 nm, while high molecular weight polysilicic acid has a particle size of greater than 10 nm.

Optionally a coagulant such as, for example, a metal salt can be used in the process of this invention. Iron and aluminum are particularly useful. Acid metal salts can be used to reduce pH and act as a charge donor. Examples of suitable coagulants include, but are not limited to, ferric chloride, ferrous sulfate, zinc chloride, zinc sulfate, alum, aluminum chloride, polyaluminum chloride, and combinations of two or more thereof. Any quantity of metal salt can be used so long as the quantity can enhance the flocculation of biosolids, however, low concentrations of metal salts are preferred. Coagulants can also be the low molecular weight organic polymers disclosed above.

Finally, anionic polymers such as anionic polyacrylamide can be added to enhance flocculation.

Process

Also, as disclosed above, a coagulant can be used. Further, a metal salt, especially an iron or aluminum salt can be optionally added. These reagents, anionic inorganic colloid, organic polymer and optional acid and/or metal salt, can be contacted with the stream in any sequential order, or one or more can be contacted simultaneously with the aqueous stream.

The flocculated biosolids can optionally be separated from the treated stream by conventional separation processes such as sedimentation, flotation, filtering, centrifugation, decantation, or combinations of such processes. The separated biosolids can subsequently be recovered and used in numerous applications. It has also been surprisingly found that the recovered biosolids from this process have reduced odor when dry, relative to those recovered from a process using ferric chloride as part of a flocculating system.

EXAMPLES

Example 1

A sample of a wash water containing about 1000 ppm of un-flocculated protein containing biosolids was obtained from an Eastern Shore poultry processing plant. The initial turbidity was >200. The initial pH was about 7.

The following reagents were added in all of the runs to a beaker: high molecular weight cationic polyacrylamide, Percol 182®, available from Ciba Specialty Chemicals, Basel, Switzerland, 8 ppm; silica microgel solution, Particol® MX, 120 ppm ($SiO_2$ basis), available from E. I. du Pont de Nemours and Company, Inc., Wilmington, Del. The amounts given were based on the solution weight of the wash water.

The reagents were added as follows.

(1) 250 ml of the wash water was stirred at medium speed on a Fisher Scientific Model #120 MR magnetic stirrer, available from Fisher Scientific, Pittsburgh, Pa. Dilute sodium hydroxide or sulfuric acid was added to adjust to pH shown in Table 1.

(2) Cationic polyacrylamide was added at time=0.

(3) Silica microgel was added at time=1 minute.

(4) At time=2 minutes, stirrer speed was reduced to slow.

(5) At time=4 minutes, the stirrer was stopped and the flocculated solids were allowed to settle to the bottom of the beaker.

(6) At time=10 minutes, turbidity of the wash water was measured using a Hach Ratio Turbidity Meter, available from Hach Company, Loveland, Colo., in NTU, as an indication of water clarification and ability to recover protein.

(7) At time=20 minutes, a second dose of polyacrylamide, 8 ppm, was added and the stirrer turned to medium speed.

(8) At time=21 minutes, the stirrer speed was reduced to slow, and at 23 minutes, the stirrer was stopped.

(9) Turbidity was measured at time=30 minutes.

TABLE 1

| Run | Wash Water pH | Turbidity 10 min. | Turbidity 30 min. |
|---|---|---|---|
| 1 | 8.0 | 88 | 63 |
| 2 | 6.9 | 79 | 55 |
| 3 | 6.5 | 77 | 42 |
| 4 | 5.5 | 25 | 2 |
| 5 | 4.5 | 30 | 1 |
| 6 | 3.5 | 10 | 2 |

Table 1 shows that the turbidity decreased upon addition of the cationic polymer and silica microgel. Best results were observed at lower pH. Turbidity improved with the second addition of polyacrylamide with the best results again occurring at pH less than 7.

Example 2

The poultry processing wash water of Example 1 was used with several different anionic inorganic colloids. The following anionic inorganic colloids were used: Ludox® SM colloidal silica, 30 wt % silica sol, surface area=300 $m^2/g$; Ludox® HS-30 colloidal silica, 30 wt % silica sol, surface area=230 $m^2/g$; Ludox® 130 colloidal silica, 30 wt % silica sol, surface area=130 m²/g; Ludox® colloidal silicas are available from E. I. du Pont de Nemours and Company, Wilmington, Del.; BMA-670, low "S" value colloidal silica sol, surface area=850 m²/g, available from Eka Chemicals AB, Bohus, Sweden; Colloidal silica sol, 4 nm, surface area=750 m²/g, available from Nalco Chemical Company, Naperville, Ill.

Particol® MX, polysilicate microgel, surface area=1200 m²/g, available from E. I. du Pont de Nemours and Company. The high molecular weight cationic organic polymer was Percol 182®.

The following procedure was followed for all of the runs:

(1) In a beaker, while stirring at medium speed, 250 ml of the poultry processing wash water of Example 1 was adjusted to pH 4.5 by addition of dilute sulfuric acid.

(2) An anionic inorganic colloid, 40 ppm on an $SiO_2$ basis, based on the solution weight of the wash water, was added to the acidified wash water at time=0.

(3) At time=1 minute, 4 ppm of the high molecular weight cationic organic polymer was added.

(4) At time=2 minutes, the stirrer speed was reduced to its lowest setting.

(5) At time=4 minutes, the magnetic stirrer was turned off.

(6) At time=10 minutes, the turbidity of the wash water above the flocculated solids was measured.

TABLE 2

| Colloid | Turbidity at 10 min. |
|---|---|
| Ludox ® SM | 15 |
| Ludox ® HS-30 | 24 |
| Ludox ® 130 | 28 |
| BMA-670 ® | 11 |
| Nalco $SiO_2$ sol | 11 |
| Particol ® MX | 2.5 |

As can be seen from Table 2, different anionic inorganic colloids, included here as examples are colloidal silica sols, low S value colloidal silica sols and polysilicate microgels, can be used in combination with an acid and a high molecular weight cationic organic polymer, all of which were effective to reduce turbidity of the protein containing wash water. The flocculated biosolids settled from the water to the bottom of the beaker. Lower turbidity resulted when using higher surface area silica sols. However, essentially the same results can be achieved with lower surface area silica sols when used at higher dosage rates.

Examples 3–8

A second poultry processing wash water containing about 1390 ppm of biosolids was used in these examples. The initial turbidity was >200. The following reagents were added to the wash water per the quantities provided below in Tables 3–8: a low molecular weight cationic organic polymer, diallyldimethylammonium chloride polymer (polydadmac); anionic inorganic colloids: Nalco colloidal silica sol, Particol® polysilicate microgel, and bentonite clay; and; a high molecular weight cationic organic polymer, Percol 182®, polyacrylamide (PAM). Amounts of reagents added are provided in Tables 3–8, all amounts are in ppm, based on the solution weight of the wash water.

Example 3 (Comparative)

250 ml of the wash water was stirred at medium speed. Polydadmac was added at time=0. At time=10 seconds, an anionic inorganic colloid was added. After 15 seconds, mixing was stopped and the wash water was transferred to an air flotation set up comprising a 300 ml tall form beaker equipped with a fritted glass sparger (30 mm diameter medium porosity) centered in the beaker. Approximately 50 ml per minute of air at 1 psi was sparged into the wash water until time=4 minutes, when the air sparging was stopped. Turbidity was recorded at 5 and 10 minutes.

TABLE 3

| | | Colloid | | Turbidity | |
|---|---|---|---|---|---|
| Run | Polydadmac ppm | Nalco sol $SiO_2$, ppm | Particol ® MX $SiO_2$, ppm | 5 min. | 10 min. |
| 1 | 10 | 20 | | >200 | >200 |
| 2 | 10 | 40 | | >200 | >200 |
| 3 | 10 | | 20 | >200 | >200 |
| 4 | 10 | | 40 | >200 | 129 |
| 5 | 16 | 20 | | >200 | >200 |
| 6 | 16 | 40 | | >200 | >200 |
| 7 | 16 | | 20 | >200 | >200 |
| 8 | 16 | | 40 | >200 | 112 |

As can be seen from Table 3, the combination of a low molecular weight cationic organic polymer and an anionic inorganic colloid, here colloidal silica or polysilicate microgel, was insufficient to reduce turbidity to provide a clarified wash water. In Runs 1, 2, 5 and 6 no floc was formed. In Runs 3, 4, 7 and 8 a small dispersed floc was formed, which contained protein solids, but the floc could not be separated from the wash water.

Example 4

The same process as in Example 3 was followed except with the added step of adding a high molecular weight cationic organic polymer, polyacrylamide, 10 seconds after the addition of the anionic inorganic colloid. Mixing was stopped 15 seconds after the addition of the polyacrylamide. Table 4 provides the quantities of reagents added and results.

TABLE 4

| | | Colloid | | | Turbidity | |
|---|---|---|---|---|---|---|
| Run | Polydadmac ppm | Nalco sol ppm, $SiO_2$ | Particol ® MX ppm, $SiO_2$ | PAM ppm | 5 min. | 10 min. |
| 9 | 10 | 20 | | 6 | >200 | 66 |
| 10 | 10 | 40 | | 6 | >200 | 57 |
| 11 | 10 | | 20 | 6 | 65 | 32 |
| 12 | 10 | | 40 | 6 | 38 | 19 |
| 13 | 16 | 20 | | 6 | >200 | >200 |
| 14 | 16 | 40 | | 6 | 185 | 82 |
| 15 | 16 | | 20 | 6 | 120 | 44 |
| 16 | 16 | | 40 | 6 | 15 | 12 |

As can be seen from Table 4, addition of a high molecular weight cationic polymer to the combination of a low molecular weight cationic polymer and an anionic inorganic colloid enhanced wash water clarification by reducing turbidity. In Runs 9, 10, 11, 12, 15 and 16 voluminous flocks were formed which separated to the top and/or bottom of the wash water. These flocs could be recovered. In Run 13, at the higher loading of cationic polydadmac, there may be an excess of cationic sites left. The amount of added anionic inorganic colloid was not effective to balance the loading of the cationic polymer. Therefore, significant solids remained in suspension, hence the high turbidity value.

Example 5 (Comparative)

The process of Example 3 was repeated with use of bentonite clay as the anionic inorganic colloid. Table 5 provides the quantities of reagents added and results.

TABLE 5

| | Polydadmac | Bentonite | Turbidity | |
|---|---|---|---|---|
| Run | ppm | ppm, SiO$_2$ | 5 min. | 10 min. |
| 17 | 10 | 100 | >200 | >200 |
| 18 | 10 | 200 | >200 | >200 |
| 19 | 16 | 100 | >200 | >200 |
| 20 | 16 | 200 | >200 | >200 |

As can be seen from Table 5, the combination of a low molecular weight cationic organic polymer and bentonite as the anionic inorganic colloid was insufficient to reduce turbidity to provide a clarified wash water. Very fine dispersed flocs were formed which could not be separated from the wash water.

Example 6

The process of Example 5 was repeated using bentonite clay as the anionic inorganic colloid. Table 6 provides the quantities of reagents added and results.

TABLE 6

| | Polydadmac | Bentonite | PAM | Turbidity | |
|---|---|---|---|---|---|
| Run | ppm | ppm, SiO$_2$ | ppm | 5 min. | 10 min. |
| 21 | 10 | 100 | 6 | >200 | 147 |
| 22 | 10 | 200 | 6 | 84 | 46 |
| 23 | 16 | 100 | 6 | >200 | >200 |
| 24 | 16 | 200 | 6 | 158 | 77 |

As can be seen from Table 6, addition of a high molecular weight cationic polymer to the combination of a low molecular weight cationic polymer and bentonite clay as the anionic inorganic colloid enhanced wash water clarification by reducing turbidity. In Runs 21 and 23 fine dispersed flocs were formed, in which there was not an effective amount of bentonite added to neutralize a sufficient number of the cationic charge sites present. It is believed that since bentonite clay does not have high surface area, more bentonite clay must be added as an effective amount. In these runs, the solids did not separate very well. In Runs 22 and 24 voluminous flocs were formed which separated to the top and bottom from the wash water.

Example 7

250 ml of the wash water was stirred at medium speed. Dilute sulfuric acid was added to reduce to pH 3.5. At time=0, an anionic inorganic colloid was added. At time=10 seconds, a high molecular weight cationic polyacrylamide was added. After 15 seconds, mixing was stopped and the wash water was transferred to the air flotation set up described in Comparative Example 3. Air was sparged into the wash water at a rate of 50 ml per minute of air at 1 psi until time=4 minutes, when the air sparging was stopped. Turbidity was recorded at 5 and 10 minutes.

TABLE 7

| | Colloid, ppm, SiO$_2$ | | | PAM | Turbidity | |
|---|---|---|---|---|---|---|
| Run | Nalco sol | Particol ® MX | Bentonite | Ppm | 5 min. | 10 min. |
| 25 | 20 | | | 6 | 163 | 151 |
| 26 | 40 | | | 6 | 136 | 125 |
| 27 | | 20 | | 6 | 29 | 17 |
| 28 | | 40 | | 6 | 12 | 10 |
| 29 | | | 100 | 6 | >200 | 131 |
| 30 | | | 200 | 6 | 90 | 38 |

As can be seen from Table 7, by lowering the pH of the wash water followed by addition of both an anionic inorganic colloid (here examples of colloidal silica sol, bentonite clay and polysilicate microgels) and a high molecular weight cationic organic polymer, turbidity was reduced. In all of the runs, fine to large to compact flocs containing solid proteins were formed which separated to the top and/or bottom of the wash water. The protein-containing flocs could be recovered.

Example 8

250 ml of a poultry processing wash water was stirred at medium speed. Dilute sulfuric acid was added to reduce to pH 3.5. At time=0, Particol® MX polysilicate microgel was added. At time=20 seconds, a high molecular weight cationic polyacrylamide (PAM) was added. At time=30 seconds, mixing was stopped and the wash water was transferred to the air flotation set up described in Comparative Example 3. Air was sparged into the wash water at a rate of 100 ml per minute of air at 1 psi until time=4 minutes, when the air sparging was stopped. Turbidity was recorded at 5 and 10 minutes. The liquid was then drained from the air flotation set up through a screen at time=12 minutes and turbidity of the drained liquid was measured. The protein containing solids were collected on the screen.

TABLE 8

| | Particol ® MX | PAM | Turbidity | | Drained |
|---|---|---|---|---|---|
| Run | ppm, SiO$_2$ | ppm | 5 min. | 10 min. | liquid |
| 31 | 20 | 6 | 51 | 30 | 28 |
| 32 | 40 | 6 | 14 | 10 | 13 |

As can be seen from Table 8, the turbidity of the wash water was reduced over time. Further, this example demonstrates separation of the solids from the wash liquid as the solids were collected on the screen. The turbidity of the drained liquid showed little change from the value at 10 minutes, indicating that the solids were retained on the screen and did not become redispersed in the process and pass through.

Example 9

Another sample of a wash water containing about 1000 ppm of un-flocculated biosolids was obtained from an Eastern Shore poultry processing plant, having a turbidity of over 200.

Polysilicate microgel solution, Particol® MX, was stabilized with sulfuric acid. The microgel solution was aged for various periods of time before use, the aging times provided in Table 9.

250 ml of the wash water was stirred at medium speed. At time=0, high molecular weight polyacrylamide, Percol 182®, 8 ppm, based on the solution weight of the wash water, was added. At time=1 minute, the acid stabilized aged polysilicate microgel solution was added, 120 ppm, based on the solution weight of the wash water. Runs were made for each aging time. At time=2 minutes, the stirring speed was reduced to slow. At time=5 minutes, the stirring was stopped. At time=15 minutes, turbidity of the wash water was measured.

TABLE 9

| Aging Time | Turbidity |
| --- | --- |
| 15 seconds | 122 |
| 5 minutes | 39 |
| 15 minutes | 21 |
| 45 minutes | 5 |

As can be seen from the results in Table 9, the combination of an acid stabilized polysilicate microgel and cationic polyacrylamide was sufficient to reduce turbidity of the wash water without the need to first reduce pH to less than 7. In addition, the results show that longer aging times of the polysilicate microgel provided further improvements in reducing turbidity. In another experiment with similarly aged microgel solution, the average size of the microgel increased from 5 nm at 15 seconds aging time to 230 nm at 45 minutes aging time.

Example 10

250 ml of soybean whey solution from Protein Technologies, Inc. containing 0.51% protein was stirred at medium speed. Dilute sulfuric acid was added to adjust to pH 2.5. 160 ppm, based on the solution weight of the soybean solution, of BMA-9 colloidal silica, available from Eka Chemicals AB, Bohus, Sweden, was added at time=0 and mixed for 10 minutes at medium speed. 8 ppm, based on the solution weight of the soybean solution, of high molecular weight polyacrylamide, Percol® 182, was then added and mixed for 10 minutes. The mixture was filtered using glass filter paper 934AH, available from Whatman, Clifton, N.J. 0.11 grams of solid protein were recovered. The filtered solution contained 0.416% protein, representing a 20% reduction in protein content. The combination of acid, colloidal silica and high molecular weight polyacrylamide were effective to allow recovery of the soybean whey protein.

Example 11

An aqueous waste stream from an Eastern Shore poultry processing plant was treated on-stream in accordance with this invention in a continuous process. To the waste stream was added simultaneously, sufficient sulfuric acid to reduce the pH of the stream to 3.7 and Particol® MX, polysilicate microgel, 95 ppm $SiO_2$, based on the solution weight of the stream. Downstream (about 30 seconds) from the point of addition of the acid and the microgel was added cationic polyacrylamide, Percol 182®, 4 ppm, based on the solution weight of the stream. The stream was directed to a dissolved air flotation (DAF) unit, where the solids were floated to the surface and skimmed off for recovery. The remaining aqueous stream was tested for chemical (COD) and biological oxygen demand (BOD) and total suspended solids (TSS).

COD was determined using a Hach COD Test Kit, available from the Hach Company, Loveland, Colo. TSS was determined by Method 2450 D from "Standard Methods for Examination of Water and Wastewater", published jointly by the American Public Health Association, American Water Works Association and Water Environment Federation. BOD was determined by Method 5210 from "Standard Methods for Examination of Water and Wastewater".

TABLE 10

| Treatment | COD, mg/l | BOD, mg/l | TSS, mg/l |
| --- | --- | --- | --- |
| None | 2970 | 1393 | N/T* |
| Example 11 | 180 | 180 | 67 |

*N/T = not tested. But typically this number is about 1000 mg/l prior to treatment.

As can be seen from Table 10, the process of this invention reduced chemical and biological oxygen demand of the waste stream in a continuous flow process of an actual poultry processing plant.

Example 12

A slurry of 20 grams of Staley Pearl Starch, unmodified cornstarch in 980 grams of water was stirred at medium speed. 10 ppm $SiO_2$, as Particol® MX, acid stabilized polysilicate microgel solution, based on the weight of the starch slurry, was added at time=0 and mixed for 15 seconds. High molecular weight polyacrylamide, Percol® 182, 2 ppm, based on the solution weight of the starch slurry, was then added at time=15 seconds and mixed for 30 seconds. Mixing was then stopped.

Turbidity measured after 30 seconds of standing, at time=45 seconds, was 46. The test was repeated, the only difference being 20 ppm of $SiO_2$, as Particol® MX, was used. Turbidity at 45 seconds was 29. In a third comparative test, the Particol® MX was not added. Turbidity was 186.

Example 13

A sample of wastewater was obtained from an Eastern Shore poultry processing plant. The wastewater had a COD of >2100 ppm, an initial turbidity of >200, and a pH of 6.1. Into a 400 ml beaker was placed 250 ml of the wastewater. The wastewater was stirred using a mechanical propeller type stirrer at 275 rpm. The pH of the wastewater was adjusted using dilute $H_2SO_4$ to pH 5.5. At time=0, Particol® MX, silica microgel, was added. At time=15 seconds, cationic polymer, polyacrylamide (PAM), Percol® 182 was added. At time=25 seconds, or 10 seconds after the polymer was added, the mixer speed was reduced to 150 rpm. Mixing was stopped 40 seconds after the addition of the polymer. The wastewater was sampled for turbidity measurements at 35 and 95 seconds after mixing was stopped. The pH was measured after the 95 second turbidity measurement. The flocculated wastewater was then re-suspended by mixing for 30 seconds at 150 rpm. After 1 minute, the agitation was discontinued the wastewater was sampled for COD measurements.

COD was determined using 0–1500 ppm COD colorimetric analysis ampules from CHEMetrics, Calverton, Va. and a Milton Roy Spectronic model 20 spectrophotometer set at 620 nm wavelength. Table 11 provides the quantities of reagents added and results for these runs, which are 33 and 34.

Example 14

The process of Example 13 was repeated using the same wastewater sample. However, instead of adding acid, 32 ppm of $FeCl_3$ was added 15 seconds prior to addition of the Particol® MX. All times from Example 13 are shifted by adding 15 seconds. Quantities of reagents added and results are provided as Run 35 in Table 11.

TABLE 11

| Run | Particol® MX, ppm, $SiO_2$ | Cationic PAM, ppm | Turbidity 35 sec | Turbidity 95 sec | Final pH | COD, ppm |
|---|---|---|---|---|---|---|
| 33 | 120 | 12 | 33 | 32 | 5.68 | 475 |
| 34 | 80 | 12 | 10 | 9 | 5.63 | 386 |
| 35 | 120 | 12 | 16 | 14 | 5.61 | 415 |

As can be seen from Table 11, the combined use of acid or ferric chloride, silica microgel, and cationic polyacrylamide were effective to reduce turbidity, and chemical oxygen demand in a wastewater stream containing biosolids.

Example 15

The process of Example 13 was repeated using the same wastewater sample. However, there was no step to reduce pH and the organic polymer was varied. At time=0, Particol® MX was added. At time=15 seconds, low molecular weight cationic polymer, polyamine, Agelfloc® A50HV, available from Ciba Specialty Chemicals, was added. At time=30 seconds, a second organic polymer was added, either cationic polyacrylamide (PAM), Percol® 182 or anionic polyacrylamide (PAM), Percol® 155 PG, also available from Ciba Specialty Chemicals, was added. At time=40 seconds, or 10 seconds after the polymer was added, the mixer speed was reduced to 150 rpm. Mixing was stopped 40 seconds after the addition of the polymer. The wastewater was sampled for turbidity measurements at 35 and 95 seconds after mixing was stopped. The pH was measured after the 95 second turbidity measurement. The flocculated wastewater was then re-suspended by mixing for 30 seconds at 150 rpm. After 1 minute, the agitation was discontinued the wastewater was sampled for COD measurements. Table 12 provides the quantities of reagents added and results.

TABLE 12

| Run | Particol® MX, ppm, $SiO_2$ | Poly-amine, ppm | Cationic PAM, ppm | Anionic PAM, ppm | Turbidity 35 sec | Turbidity 95 sec | Final pH | COD, ppm |
|---|---|---|---|---|---|---|---|---|
| 36 | 50 | 40 | 12 |  | 185 | 84 | 6.03 | 444 |
| 37 | 50 | 40 |  | 12 | 33 | 28 | 5.98 | 429 |
| 38 | 100 | 40 | 12 |  | 5 | 4 | 5.99 | 415 |
| 39 | 100 | 40 |  | 12 | 6 | 3 | 5.99 | 540 |

Table 12 shows that different organic polymers and in different combinations can be used with an anionic colloid to clarify wastewater and reduce chemical oxygen demand. In Runs 36 and 38, a low molecular weight cationic polyamine was used in combination with a high molecular weight polyacrylamide to effectively reduce turbidity and COD in a wastewater from poultry processing. In Runs 37 and 39, the polyamine was used in combination with an anionic polyacrylamide to effectively reduce turbidity and COD in a wastewater from poultry processing.

Example 16

The process of Example 13 was repeated with the difference of adding base, sodium hydroxide to increase pH to 6.5 prior to the addition of the Particol® MX. The remaining steps were performed without change. Table 13 provides the quantities of reagents added and results.

TABLE 13

| Run | Particol® MX, ppm, $SiO_2$ | Cationic PAM, ppm | Turbidity 35 sec | Turbidity 95 sec | Final pH | COD, ppm |
|---|---|---|---|---|---|---|
| 40 | 80 | 12 | 55 | 55 | 6.42 | 766 |
| 41 | 40 | 12 | 34 | 34 | 6.51 | 628 |

As can be seen from Table 13, clarification of the wastewater stream and reduction of its chemical oxygen demand can be achieved at pH close to 7, with use of an anionic colloid and cationic polymer.

Example 17

A series of runs was performed for comparing the process of the present invention with alternatives. A wash water having a pH of 6.5, a chemical oxygen demand (COD) of 3500 and a turbidity of >200 was obtained from an Eastern Shore poultry processing plant. The wash water was treated according to the process of the instant invention with modifications described below. Where amounts are given, they are based on the solution weight of the wash water. The reagents were added in the order provided below to the wash water, with stirring. After addition of the reagents, stirring was stopped and the samples were allowed to settle for 1 minute. After 1 minute of settling a 1 minute COD and 1 minute turbidity were measured for Runs 51 and 55–58. For Runs 52–54, there was no apparent flocculation so COD and turbidity were not measured at that time. Samples were then allowed to settle for at least an hour. Samples from Runs 52 and 53 were allowed to settle for over 4 hours. Settled COD was then measured for all samples. Samples from Runs 52–54 were then hand stirred and let settle for 1 minute, at which time 1 minute COD and 1 minute turbidity were measured.

Run 51 was based on the process of the instant invention wherein the pH of the wash water was reduced to 5.0 by addition of sulfuric acid. 80 ppm of silica microgel, on a silica basis, prepared in accordance with the present invention, and 10 ppm of a high molecular weight cationic polyacrylamide, Percol 7650® were added.

Run 52 was a comparative run. Sulfuric acid was added to reduce pH of wash water to 3.5. 10 ppm of cationic polyacrylamide was added. (Note: This run was repeated using 20 ppm of the cationic polyacrylamide, with essentially no change in results.)

Run 53 was a comparative run. Sulfuric acid was added to reduce pH to 3.5. 40 ppm of alkali lignin and 10 ppm of cationic polyacrylamide were added. (Note: This run was repeated using 20 ppm of cationic polyacrylamide, with essentially no change in results.)

Run 54 was a comparative run. Silica microgel, 7.5 ppm, on a silica basis, 60 ppm bentonite, 7.5 ppm chitosan, 0.1 ppm anionic polyacrylamide were added.

Run 55 was a comparative run. Silica microgel, 7.5 ppm, on a silica basis, 80 ppm FeCl$_3$, 60 ppm bentonite, 7.5 ppm chitosan, and 0.1 ppm anionic polyacrylamide were added.

Run 56 was a comparative run. Sulfuric acid was added to reduce to pH 3.5. In addition the following reagents were added: 7.5 ppm silica microgel, on a silica basis, 80 ppm FeCl$_3$, 60 ppm bentonite, 7.5 ppm chitosan, 0.1 ppm of anionic polyacrylamide, and 10 ppm of cationic polyacrylamide.

Run 57 was a comparative run. Sulfuric acid was added to reduce to pH 3.5. In addition the following reagents were added: 7.5 ppm silica microgel, on a silica basis, 60 ppm bentonite, 7.5 ppm chitosan, 0.1 ppm of anionic polyacrylamide, and 10 ppm of cationic polyacrylamide.

Run 58 was based on process of the instant invention wherein the pH of the wash water was reduced to 5.0 by addition of sulfuric acid. 80 ppm of silica microgel, on a silica basis, prepared in accordance with the present invention, and 20 ppm of a high molecular weight cationic guar gum, Jaguar 8917® were added.

TABLE 14

| Run | Settled COD | 1 Min. COD | Turbidity @ 1 Min. |
|---|---|---|---|
| 51 | 879 | 904 | 4 |
| 52 | >1554 | >1554 | >200 |
| 53 | 1296 | >1554 | >200 |
| 54 | 1334 | >1554 | >200 |
| 55 | 810 | >1554 | >200 |
| 56 | nm* | >1554 | >200 |
| 57 | nm* | 1416 | >200 |
| 58 | nm* | 1094 | 19 |

*nm = not measured

The results shown in Table 14 demonstrate unexpected and superior results were achieved in terms of combined reduction of COD and turbidity for the Runs based on the present application relative to results from comparative examples based on prior art. The results further show the comparative runs did not appreciably reduce COD or turbidity, i.e., clarify the wash water.

Run 58 in Table 14 exemplifies guar gum, a high molecular weight cationic polymer, was effective in reducing COD and turbidity of a waste water.

By way of further illustration disclosed are figures, which are photographs showing performance of the Runs 51–57, above. All photographs were taken after settled samples were hand stirred and allowed to resettle for one minute.

FIG. 1 corresponds to Run 51, which illustrates the process of the instant invention and shows flocculated solids deposited on the bottom of the flask.

Figure 2:
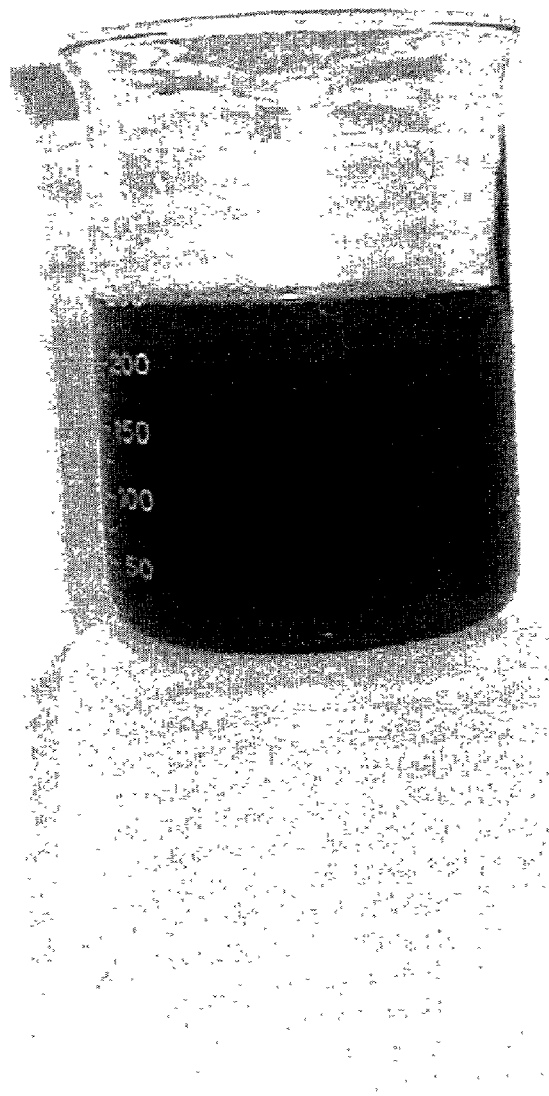
FIG. 2 is a photograph showing the results of Example 17, Run 52, at 10 ppm cationic polyacrylamide.
Figure 3:
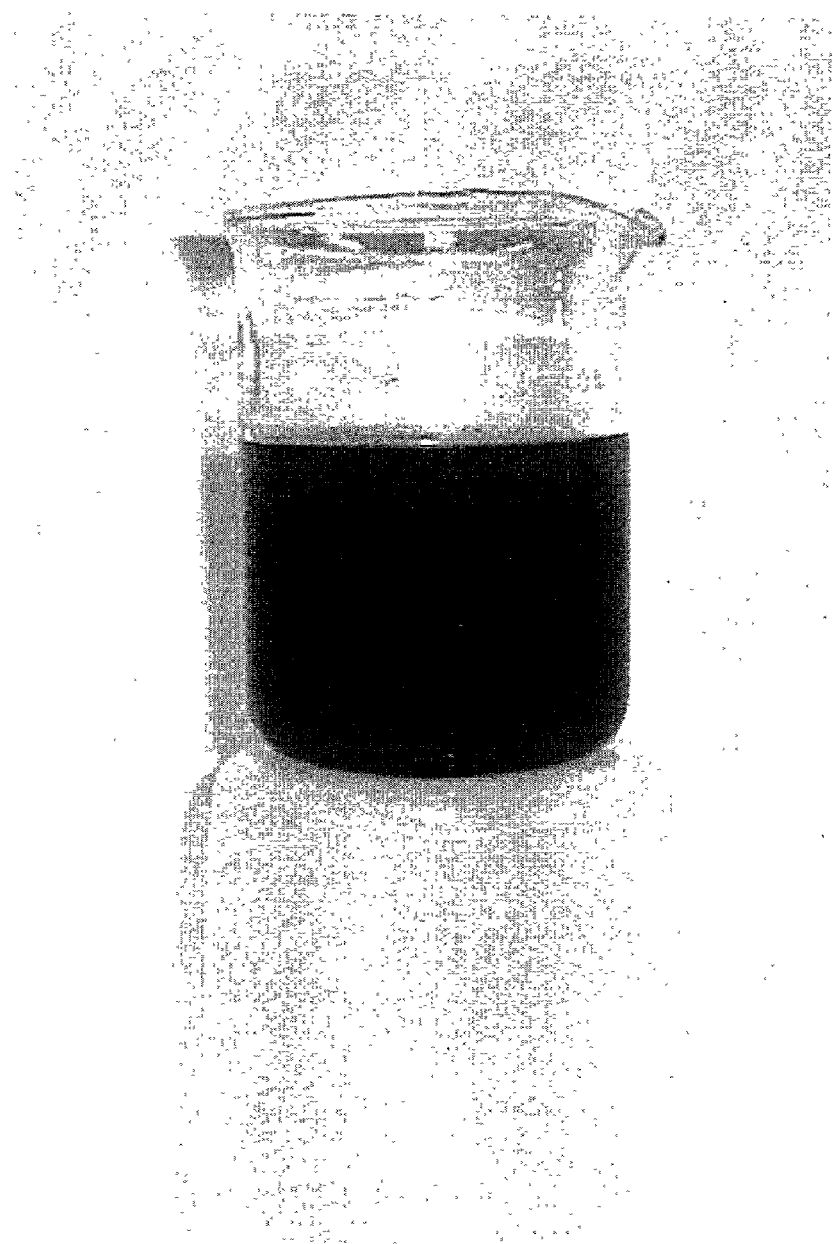
FIG. 3 is a photograph showing the results of Example 17, Run 52, at 20 ppm cationic polyacrylamide.

FIGS. 2 and 3 show intensely colored liquid, no flocculated solids, corresponding to Run 52 at 10 ppm and 20 ppm cationic polyacrylamide, respectively. Run 52 is comparative to show use of acid and a cationic polymer.

Figure 4:
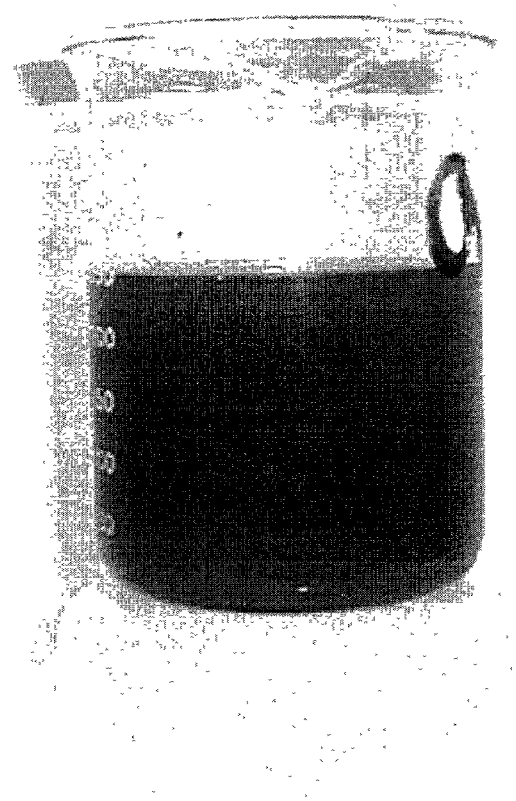
FIG. 4 is a photograph showing the results of Example 17, Run 53, at 10 ppm cationic polyacrylamide.
Figure 5:
FIG. 5 is a photograph showing the results of Example 17, Run 53, at 20 ppm cationic polyacrylamide.

FIGS. 4 and 5 also show intensely colored liquid, no flocculated solids, corresponding to Run 53 at 10 ppm and 20 ppm cationic polyacrylamide, respectively. Run 53 was comparative to show use of acid, cationic polymer and lignin.

Figure 6:
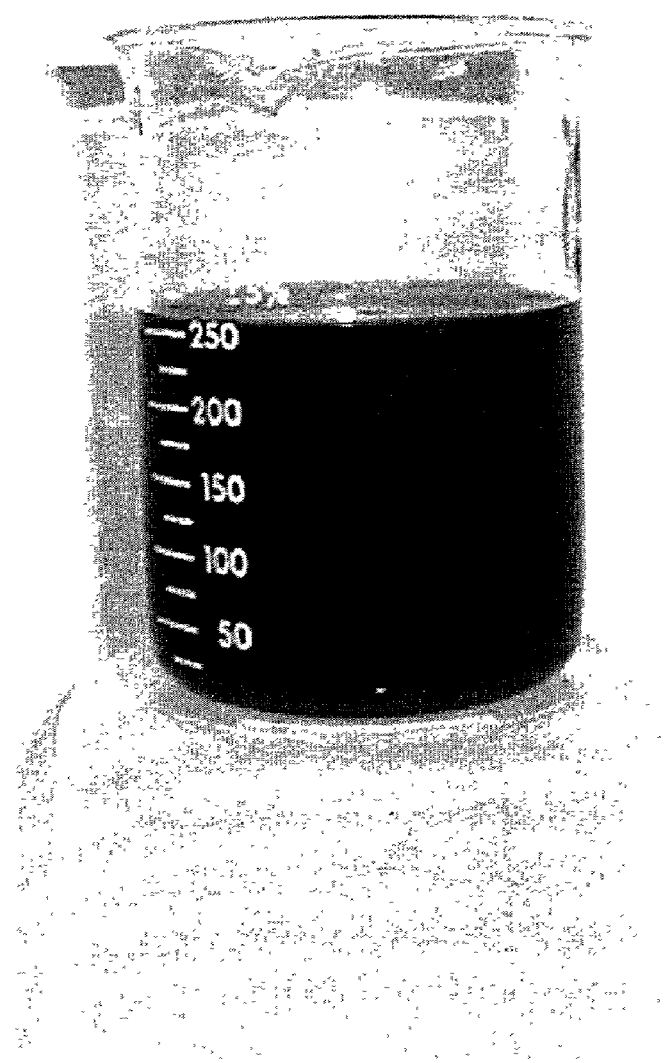
FIG. 6 is a photograph showing the results of Example 17, Run 54.

FIG. 6 corresponds to Run 54. FIG. 6 shows an intensely colored liquid with no flocculated solids.

Figure 7:
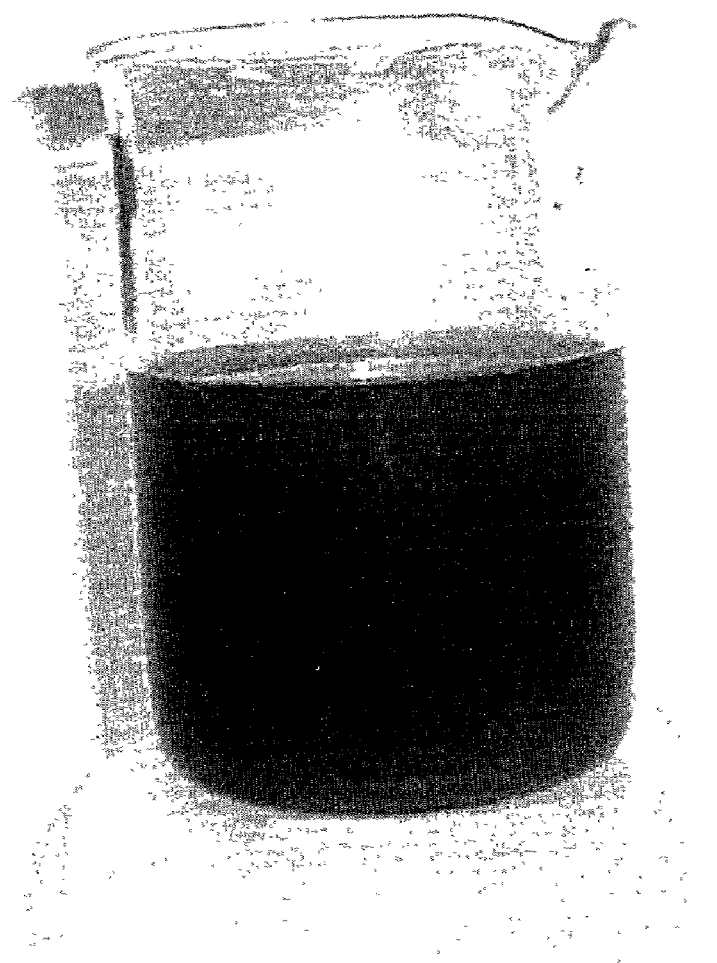
FIG. 7 is a photograph showing the results of Example 17, Run 55.

FIG. 7 corresponds to Run 55. It shows an intensely colored liquid with no flocculated solids.

Figure 8:
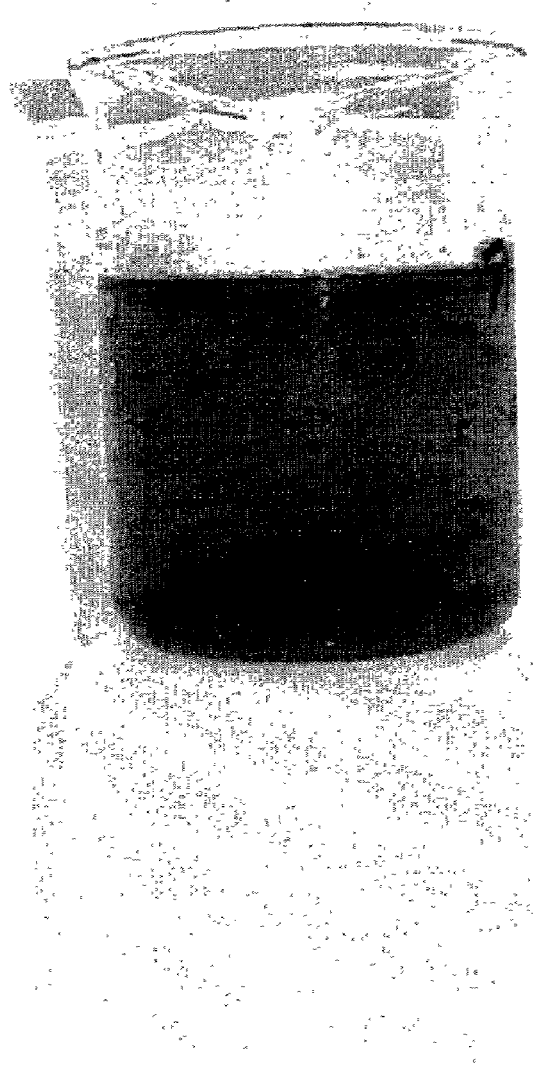
FIG. 8 is a photograph showing the results of Example 17, Run 56.

FIG. 8 corresponds to Run 56. FIG. 8 shows some flocculation of solids, with some solids settled to the bottom of the beaker. Data in Table 14 still show this sample has high COD and high turbidity.

Figure 9:
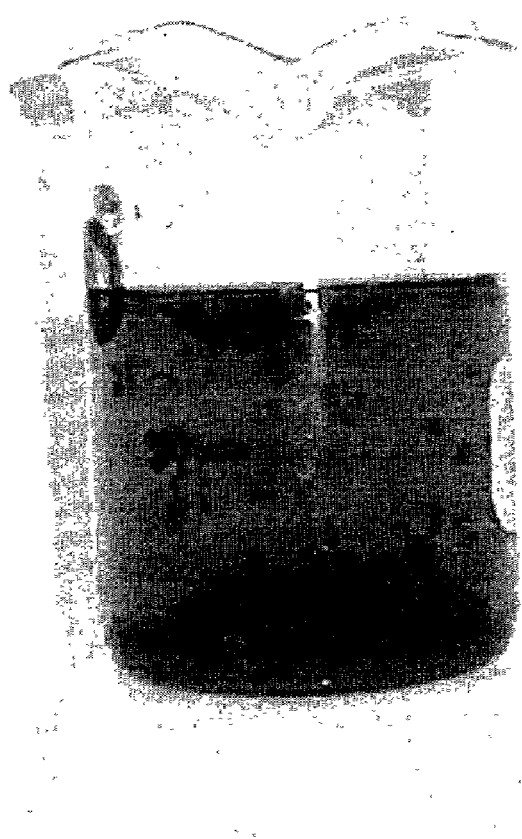
FIG. 9 is a photograph showing the results of Example 17, Run 57.

FIG. 9 corresponds to Run 57. FIG. 9 shows some flocculation of solids, with some solids settled to the bottom of the beaker. Some solids can be seen on top of the treated wash water and some solids suspended in the wash water. Data in Table 14 still show this sample has high COD and high turbidity.

Only the Examples based on the instant process provide fast flocculation times, which are important to meet industry's needs.

Examples 18–23

Additional Examples are provided below to demonstrate utility of the process of the invention to treat different streams containing biosolids. For consistency of results for comparative purposes, silica microgel, Particol® MX, was used in the following Examples, prepared in accordance with the instant invention.

Example 18

Activated sludge wastewater from a corn processing plant aerobic treatment basin was tested. The wastewater was treated with 20 ppm A50-HV polyamine and 8 ppm Percol® 7650 cationic polyacrylamide both from Ciba Specialty Chemicals, followed by 40 ppm of silica microgel solution. COD of the wastewater was reduced from 2790 to 445 ppm.

Example 19

Wastewater from the oil separation step of a corn processing plant was tested. The wastewater was treated with 80 ppm of silica microgel solution, 40 ppm Al$_2$O$_3$ as alum, and 4 ppm Percol 7650 cationic polyacrylamide. COD was reduced from 2830 to 1040 ppm.

Example 20

Wastewater from a prepared foods cook plant was tested. The water contained proteins, fats, and carbohydrates and was partially treated by use of a dissolved air flotation unit without the aid of chemical flocculants. Effluent from the air flotation unit had an average COD of >4000 ppm. The influent to the air flotation unit was treated with 20 ppm of A50-HV polyamine, 100 ppm of silica microgel solution and 12 ppm of Percol® 7650. COD of the effluent from the air flotation unit was found to average 940 over a 3 day period.

Example 21

A 500 ppm solution of egg albumin (purchased from VWR Scientific) was adjusted to pH 5 with dilute sulfuric acid and then treated with 120 ppm of silica microgel solution followed by 10 ppm of cationic polyacrylamide (Hychem 904). COD of the albumin solution was reduced from 557 to 241 ppm. A 1000 ppm egg albumin solution was treated in an identical manner. COD was reduced from 1094 to 684 ppm.

Example 22

Wastewater from a turkey processing plant having a COD of 3500 ppm was treated with colloidal tin oxide (Sn-15 from PQ Corporation) and Percol 7650 cationic polyacrylamide. The colloidal tin oxide has a surface area of approximately 200 m$^2$/gm. The use of 240 ppm of colloidal tin oxide and 10 ppm CPAM produced a COD of 704 ppm. 480 ppm of colloidal tin oxide and 20 ppm CPAM produced a COD of 574 ppm illustrated that colloidal tin oxide is an effective anionic inorganic colloidal for treating wastewaters containing biosolids.

Example 23

Following the test procedure of Example 12, a slurry of 20 grams of all purpose baking flour (carbohydrate) in 980 grams of water was treated with aluminum modified silica sols and Percol 7650 cationic polyacrylamide. Turbidity of the untreated slurry was >200 NTU. In the first test the slurry was treated with 40 ppm BMA-670 (low S-value aluminum modified silica sol) and 10 ppm high molecular weight cationic polyacrylamide. Turbidity at 1 minute was 38 NTU. In the second test the slurry was treated with 80 ppm of BMA-9 (5 nm aluminum modified colloidal silica sol) and 10 ppm cationic polyacrylamide. Turbidity at 1 minute was 101 NTU. Both the BMA-670 and BMA-9 aluminum modified silica sols were effective in combination with cationic polyacrylamide at reducing turbidity.

Examples 18–23 show that the process of the invention can be used to treat aqueous streams of different derivation and composition for clarification of and separation of biosolids from the stream.

Example 24

This example shows that presence of low concentration of colloidal silica did not appreciably reduce COD of a wastewater and provided essentially no flocculation of protein-based biosolids.

Medium surface area colloidal silica in conjunction with a low dose of synthetic cationic polymer (cationic polyacrylamide (CPAM) Percol® 7650 from Ciba Specialty Chemicals) was used to remove protein from water at acidic pH. Wastewater from a poultry processing site in Gainesville, Ga. was used as the source of protein-contaminated water. Colloidal silica having a surface area of 345 $m^2/g$ (7 nm diameter) was added to the wastewater at the dose rates shown below. The pH of the wastewater was adjusted to 4.7 with sulfuric acid. The wastewater was mixed with the colloidal silica and acid for 5 minutes followed by the addition of 10 ppm of CPAM. Mixing of the wastewater was stopped 45 seconds after the addition of CPAM and two minutes later a sample of the wastewater was taken and the COD was measured shown in Table 15 (the numbers in the parentheses are for a separate run).

TABLE 15

| $SiO_2$, ppm | COD, ppm | Floc |
|---|---|---|
| 0 | 3310 | Essentially none |
| 2 | 3040 (3236) | Essentially none |
| 3 | 3325 (2836) | Essentially none |
| 50 | 850 (868) | Visually apparent |

Example 25

This example also illustrates that low concentration of silica colloid did not satisfactorily remove oil-based biosolids.

High surface area colloidal silica in conjunction with a medium dose of a cationic natural polymer was used to remove castor oil from water at a slightly acidic pH. Castor oil (150 ppm, final concentration) was dispersed in hot water by mixing for 5 minutes in a blender followed by addition of aluminum sulfate (33 ppm, final concentration) to the oil/water dispersion and, 30 seconds later, by addition of colloidal silica having a surface area of 500 $m^2/g$ (5 nm diameter). The pH of the dispersion was then adjusted to 6.0 with sulfuric acid followed by mixing for an additional 5 minutes and then the addition of a cationic guar (50 ppm, final concentration). Mixing of the oil/water dispersion was stopped one minute after the addition of the guar. Three minutes later COD was measured for a sample of the wastewater as shown in Table 16.

TABLE 16

| $SiO_2$, ppm | COD, ppm | Floc |
|---|---|---|
| 0 | 573 | None |
| 2 | 634 | Essentially none |
| 50 | 70 | Visually apparent |

Example 26

This example further illustrates that carbohydrate-based biosolids were not satisfactorily removed at low concentration of silica. Colloidal silica with a high surface area that has been modified by the incorporation of aluminum onto the surface in conjunction with a high dose of an amphoteric natural polymer was used to remove carbohydrates (an all purpose baking flour) from water at neutral pH. This example also illustrates that polymer can be added before the colloidal silica with good results. Baking flour (2000 ppm, final concentration) was dispersed in water followed by addition of amphoteric potato starch (100) ppm to the flour/water dispersion and, 30 seconds later, by the addition of colloidal silica have a surface area of 500 $m^2/g$ and which had 9% of the Si atoms on its surface replace with Al. Mixing of the dispersion was stopped one minute after the addition of the colloidal silica and another 1.5 minutes later a sample of the wastewater was measured for COD (Table 17).

TABLE 17

| $SiO_2$, ppm | COD, ppm | Floc |
|---|---|---|
| 0 | 1830 | None |
| 2 | 1895 | Essentially none |
| 50 | 320 | Visually apparent |

Examples 24–26 are summarized as follows (the order of addition in the table were: [a] $SiO_2$, polymer; [b] $SiO_2$, polymer; [c] polymer, $SiO_2$).

| Run | Water Contaminate | Polymer Type | Polymer Dose | Colloidal Silica | pH |
|---|---|---|---|---|---|
| 1[a] | protein (poultry waste) | Cationic, synthetic (CPAM) | low (10 ppm) | medium surface area (345 $m^2/g$) | acidic (pH 4.7) |
| 2[b] | oil (castor oil) | Cationic, natural (cationic guar gum) | medium (50 ppm) | high surface area (500 $m^2/g$) | slightly acidic (pH 6) |
| 3[c] | carbohydrates (baking flour) | Amphoteric, natural (potato starch) | high (100 ppm) | high surface area (500 $m^2/g$) modified | neutral (pH 7.5) |

-continued

| Run | Water Contaminate | Polymer Type | Polymer Dose | Colloidal Silica | pH |
|---|---|---|---|---|---|
| | | | | with aluminum | |

The results in examples 24–26 show that good biosolids removal was achieved when using the concentration range of silica disclosed and claimed in the application with cationic or amphoteric polymers, natural or synthetic, over a wide range of concentrations.

Example 27

This example demonstrates that simple addition of a cationic polymer does not necessarily create cationic site on the biosolids.

Wastewater from an Eastern shore poultry processing plant was treated by adding 40 ppm of $SiO_2$ as silica microgel solution followed 15 seconds later by addition of a cationic polyacrylamide (CPAM) at the final concentrations shown below. Mixing was stopped 45 seconds after the addition of CPAM. The samples were allowed to settle for 5 minutes and the turbidity of the "clarified water" was measured. The results are shown in Table 18.

TABLE 18

| CPAM, ppm | Turbidity |
|---|---|
| 4 | >200 (110)[a] |
| 6 | >200 (47) |
| 8 | >200 (36) |

[a]The values in the parentheses were obtained with addition of 16.5 ppm (final concentration) of polydadmac to create positive charge sites on the biosolids prior to the addition of the silica microgel solution.

These results further show that reduced turbidity was obtained by creating positive charge sites prior to the addition of the anionic colloid.

What is claimed is:

1. A process consisting essentially of contacting a substantially aqueous stream, which comprises biosolids having anionic surface charges, with (a) an anionic inorganic colloid and (b) an organic polymer to produce flocculated biosolids under a condition effective to reduce the chemical oxygen demand of said stream; and optionally removing said flocculated biosolids from said stream; before said contacting, the pH of said stream is reduced with an acid to a pH of from 4.5 to less than 7; said inorganic colloid is present in said stream in the concentration of from about 20 to about 2000 ppm by weight and is selected from the group consisting of polysilicic acid, polysilicic acid microgel, acidic polyaluminosilicate, acid-stabilized polysilicate microgel, colloidal silica, colloidal tin oxide, aluminum modified colloidal silica, clay, and combinations of two or more thereof; and said organic polymer is present in said stream in the concentration of from about 1 to about 2500 ppm by weight, has a number average molecular weight greater than 1,000,000 and is selected from the group consisting of polyacrylamide, guar gum, and combinations thereof.

2. A process according to claim 1 wherein the pH of said stream is reduced to lower than 6 and said acid is selected from the group consisting of sulfuric acid, hydrochloric acid, carbon dioxide, sulfonic acids, carboxylic acids, acrylic acids, and combinations of two or more thereof.

3. A process consisting essentially of contacting a substantially aqueous stream, which comprises biosolids having anionic surface charges, with (a) an anionic inorganic colloid, (b) an organic polymer and (c) a coagulant selected from the group consisting of ferric chloride, ferrous sulfate, zinc chloride, zinc sulfate, alum, aluminum chloride, polyaluminum chloride and combinations of two or more thereof; before said contacting, the pH of said stream is reduced with an acid to a pH of from 4.5 to less than 7; said inorganic colloid is present in said steam in the concentration of from about 20 to about 2000 ppm by weight and is selected from the group consisting of polysilicic acid, polysilicic acid microgel, acidic polyaluminosilicate, acid-stabilized polysilicate microgel, colloidal silica, colloidal tin oxide, aluminum modified colloidal silica, clay, and combinations of two or more thereof; and said organic polymer is present in said steam in the concentration of from about 1 to about 2500 ppm by weight, has a number average molecular weight greater than 1,000,000 and is selected from the group consisting of polyacrylamide, guar gum, and combinations thereof.

4. A process according to claim 1, 2, or 3 wherein said anionic inorganic colloid is selected from the group consisting of polysilicic acid, polysilicic acid microgel, acidic polyaluminosilicate, acid-stabilized polysilicate microgel, and combinations of two or more thereof.

5. A process according to claim 4 wherein said polymer is polyacrylamide.

6. A process according to claim 5 wherein said acid and said anionic inorganic colloid are added simultaneously.

7. A process according to claim 6 wherein said stream comprising biosolids is derived from food processing stream.

8. A process according to claim 5 wherein said stream comprising biosolids is derived from food processing stream.

9. A process according to claim 1, 2, or 3 wherein said anionic inorganic colloid is colloidal silica.

10. A process according to claim 9 wherein said polymer is polyacrylamide.

11. A process according to claim 10 wherein said acid and said anionic inorganic colloid are added simultaneously.

12. A process according to claim 10 wherein said stream comprising biosolids is derived from food processing stream.

13. A process consisting essentially of contacting a substantially aqueous stream, which comprises biosolids having anionic surface charges, with (a) an anionic inorganic colloid and (b) a second organic polymer to produce flocculated biosolids under a condition effective to reduce the chemical oxygen demand of said stream; and optionally removing said flocculated biosolids from said stream; before said contacting, combining said stream with an effective amount of a first organic polymer to neutralize at least 1% anionic charges in said stream and to produce some cationic sites on said biosolids wherein said first organic polymer has a number average molecular weight lower than 1,000,000 and is selected from the group consisting of polyamine, diallyl dimethyl ammonium chloride polymers, and combinations thereof; said inorganic colloid is resent in said stream in the concentration of from about 20 to about 2000 ppm by weight and is selected from the group consisting of polysilicic acid, polysilicic acid microgel, acidic polyaluminosilicate, acid-stabilized polysilicate microgel, colloidal silica, colloidal tin oxide, aluminum modified colloidal silica, clay, and combinations of two or more thereof; and said second organic polymer is present in said stream in the concentration of from about 1 to about 2500 ppm by weight, has a number average molecular weight greater than 1,000,000 and is selected from the group consisting of polyacrylamide, guar gum, and combinations thereof.

14. A process according to claim 13 wherein said anionic inorganic colloid is selected from the group consisting of polysilicate, polyaluminosilicate, polysilicic acid microgel, and combinations of two or more thereof.

15. A process according to claim 14 wherein said first organic polymer has a number average molecular weight in the range from 10,000 to 500,000 and said polymer is said high low molecular weight cationic organic polymer.

16. A process according to claim 14 wherein said stream comprising biosolids is derived from food processing.

17. A process for reducing chemical oxygen demand of a substantially aqueous stream, which comprises biosolids having anionic surface charges, consisting essentially of:
(a) contacting said stream with (1) an acid to reduce pH of said stream to pH from 4.5 to no greater than pH 6; (2) an anionic inorganic colloid selected from the group consisting of polysilicate, polyaluminosilicate, polysilicic acid microgel, and mixtures thereof;
and (3) a cationic polyacrylamide having a molecular weight of at least 1,000,000 to produce flocculated biosolids wherein said anionic inorganic colloid has an average microgel size of greater than 10 am; and
(b) removing said flocculated biosolids from said stream.

18. A process for reducing chemical oxygen demand of a substantially aqueous stream, which comprises biosolids having anionic surface charges, consisting essentially of:
(a) contacting said stream with (1) an inorganic coagulant selected from the group consisting of ferric chloride, ferrous sulfite, zinc chloride, zinc sulfate, alum, aluminum chloride, polyaluminum chloride, and combinations of two or more thereof; (2) an anionic inorganic colloid selected from the group consisting of polysilicic acid, polysilicic acid microgel, acidic polyaluminosilicate and acid-stabilized polysilicate microgel to reduce pH of said stream to pH from 4.5 to no greater than pH 6 wherein said anionic inorganic colloid has an average microgel size of greater than 10 nm; and (3) a cationic polyacrylamide having a molecular weight of at least 1,000,000 to produce flocculated biosolids; and
(b) removing said flocculated biosolids from said stream.

* * * * *

UNITED STATES PATENT AND TRADEMARK OFFICE
CERTIFICATE OF CORRECTION

PATENT NO. : 7,048,859 B1
APPLICATION NO. : 10/013406
DATED : May 23, 2006
INVENTOR(S) : Robert H. Moffett It is certified that error appears in the above-identified patent and that said Letters Patent is hereby corrected as shown below:

Column 22, line 62, "is resent in said stream" should read -- is present in said stream --.

Column 24, line 4, "greater than 10 am" should read -- greater than 10 nm --.

Signed and Sealed this

Sixth Day of May, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,048,859 B1 | Page 1 of 1 |
| APPLICATION NO. | : 10/013406 | |
| DATED | : May 23, 2006 | |
| INVENTOR(S) | : Robert H. Moffett | |

It is certified that error appears in the above-identified patent and that said Letters Patent is hereby corrected as shown below:

Column 22, line 62, "is resent in said stream" should read -- is present in said stream --.

Column 24, line 4, "greater than 10 am" should read -- greater than 10 nm --.

Signed and Sealed this

Twentieth Day of May, 2008

JON W. DUDAS
*Director of the United States Patent and Trademark Office*